United States Patent Office 2,914,414
Patented Nov. 24, 1959

2,914,414

SHAPED ARTICLES COMPRISING REGENERATED CELLULOSE

Leo J. Novak and Walter S. Hogue, Dayton, Ohio, assignors to The Commonwealth Engineering Company of Ohio, Dayton, Ohio, a corporation of Ohio No Drawing. Application March 8, 1954
Serial No. 414,863

10 Claims. (Cl. 106—162)

This invention relates to shaped articles such as fibers, yarns and films comprising regenerated cellulose and having reduced moisture pick-up and retention capacity.

The capacity of regenerated cellulose to pick up and retain moisture is a desirable characteristic, being responsible for the attractive, warm, soft "hand" or "feel" which is an advantage of regenerated cellulose fabrics over fabrics comprising the newer synthetic resins which are hydrophobic and somewhat cold and "clammy" to the touch. This characteristic of regenerated cellulose also makes clothing made wholly or predominantly of regenerated cellulose yarns more comfortable to wear since the garments will tend to absorb body moisture. However, from another point of view, the capacity of regenerated cellulose to pick up and retain relatively large amounts of moisture is a disadvantage in that it prolongs the drying time for regenerated cellulose articles after washing thereof.

Various methods have been proposed for modifying, that is, reducing, the resistance to moisture of regenerated cellulose articles, including the incorporation of synthetic resins in viscose, and the application of moistureproofing coatings to the shaped article. The incorporation of resins and other hydrophobic materials in viscose usually complicates the spinning operation and even when the resin is added in a so-called "injection spinning" method by projecting a solution of the resin into the viscose as the latter approaches the spinneret, the resin tends to exert an embrittling effect on the fibers and to detract from other properties thereof such as flexibility. On the other hand, if it is attempted to increase the moisture-resistance of fibers or films of regenerated cellulose by applying a coating of a hydrophobic material to them the problem is met that the hydrophilic base and hydrophobic coating are not compatible and do not adhere to each other satisfactorily, so that generally an anchoring agent having mixed hydrophilic-hydrophobic groups is required to insure adequate bonding of the coating to the base.

The object of the present invention is to provide shaped articles comprising regenerated cellulose having reduced moisture pick-up and retention capacity as compared to normal regenerated cellulose articles.

Another object of the invention is to provide agents for modifying the moisture pick-up and retention capacity of regenerated cellulose articles which are compatible with viscose and with regenerated cellulose and which do not deleteriously influence the properties or characteristics of the articles.

These and other objects are achieved by providing articles comprising regenerated cellulose and a water-insoluble alkali-soluble dextran or dextran derivative.

The dextrans are high molecular weight polysaccharides made up of anhydroglucopyranosidic units joined by molecular structural repeating alpha-1,6 and non-alpha-1,6 linkages at least 50% of which are, apparently, of the 1,6 type.

Dextrans may be obtained in various ways including bacterial conversion of 1,4 linkages of dextrins to 1,6 linkages of dextran. Most commonly, they are obtained by biosynthesis from sucrose, in accordance with either the "whole culture" method or the "filtered enzyme" method. In the former method, an aqueous nutrient medium containing sucrose, particular nitrogenous materials and certain inorganic salts is inoculated with a culture of a suitable microorganism, such as those of the *Leuconostoc mesenteroides* or *L. dextranicum* types, and the mass is incubated at the temperature most favorable to growth of the microorganism until maximum dextran synthesis is accomplished. In the "filtered enzyme" method, the culture of the microorganism is filtered and the filtrate containing the enzyme dextransucrase, the isolated enzyme or an aqueous solution of the isolated enzyme of suitable potency is introduced into the sucrose-bearing medium, the mass being held under controlled conditions until the dextran is synthesized.

The dextran obtained by either of the described methods has, normally, a very high molecular weight calculated to be in the millions. It can be isolated from the nutrient medium by precipitation with a water-miscible aliphatic alcohol or ketone, separated, purified, dried and reduced to particulate condition, the reduction to particulate condition being accomplished simultaneously with the drying when the purified mass is spray-dried.

The native dextran thus obtained may be readily water-soluble, difficultly water-soluble or substantially insoluble in water, depending on the microorganism (or enzyme thereof) used in the biosynthesis.

The present invention contemplates the use of those dextrans and dextran derivatives which are normally insoluble in water but soluble in aqueous alkaline solution. The dextrans which may be employed include those obtained using the microorganisms (or their enzymes) bearing the following NRRL (Northern Regional Research Laboratory) classifications: *Leuconostoc mesenteroides* B-523; *L.m.* B-742; *L.m.* B-1144; *L.m.* B-1191; *L.m.* B-1196; *L.m.* B-1208; *L.m.* B-1216; *Streptobacterium dextranicum* B-1254 and *Betabacterium vermiforme* B-1139.

Any derivative of dextran which is insoluble in water but soluble in aqueous alkaline solution may be used including such water-insoluble derivatives of water-soluble dextrans. In the presently preferred embodiment of the invention, the dextran derivative is a water-insoluble, alkali-soluble xanthate obtained by xanthation of a water-insoluble, alkali-soluble dextran such as one of those identified hereinabove, and particularly xanthated *L.m.* B-523 dextran.

The preferred procedure, in making fibers or films of regenerated cellulose from viscose is to incorporate the alkali-soluble dextran or dextran xanthate in the viscose at any time prior to spinning or casting it, and either before, during or after ripening or ageing thereof, and to then spin or cast the mixture of viscose and dextran or xanthated dextran into an acid coagulating and regenerating bath in accordance with conventional practice. Since viscose is an aqueous alkaline solution, usually an aqueous sodium hydroxide solution, of cellulose xanthate, no difficulty is experienced in distributing the selected dextran xanthate therein to obtain a homogeneous mixture.

When the xanthate of a water-insoluble dextran is used, the acid bath has the same effect thereon as it exerts on the cellulose xanthate or viscose, that is, the xanthate groups are cleaved off with regeneration of the dextran.

Although the dextrans are hydroxylated polymeric materials, they do not pick up and retain moisture in the same degree as does regenerated cellulose. Even the water-soluble dextrans can be exposed to moisture without exhibiting the same pronounced hygroscopicity as cellulose. The water-insoluble, alkali-soluble dextrans are even less hygroscopic and by substituting such a dextran for a portion of the regenerated cellulose in fibers, films, pellicles, etc. a decrease in the moisture pick-up and retention capacity of such articles is achieved. The decreased tendency of the dextrans to pick up and retain moisture may be attributed to the 1,6 linkages which usually predominate in dextran. These 1,6 linkages appear to complement the 1,4 linkages of the regenerated cellulose to result in shaped articles having a desirable combination of properties, and as the dextrans have film- and fiber-forming properties their presence in fibers and films as modifiers for regenerated cellulose does not bring about any marked depreciation in the desirable properties and characteristics normally associated with articles consisting of regenerated cellulose. The flexibility and handling properties of the fibers and films formed from the mixture are satisfactory, the appearance of the articles is essentially unchanged, the tenacity is substantially unaffected, and at the same time the moisture-sensitivity is decreased. Since the water-insoluble dextran distributed uniformly through the regenerated cellulose fibers picks up and retains less moisture than is picked up and retained by the cellulose, the total amount of moisture held in the fiber after exposure thereof to water is reduced with a consequent reduction in the drying time when fabrics formed from or comprising yarns of the fibers are exposed to water. There is also less swelling of the individual fibers and yarns and, therefore, less tendency to distortion and shrinkage of the fabrics on laundering thereof.

The dextran or dextran xanthate may be mixed with aqueous sodium hydroxide solution prior to being added to the viscose. Such a solution may be incorporated in the viscose by the injection method, in advance of the spinneret, if desired.

The amount of dextran or dextran xanthate added to the viscose may vary and may be from 2.0% to 50% on the weight of the cellulose, but usually small amounts of the order of 2.0% to 10% or 15% on the cellulose weight are satisfactory.

The dextran xanthates which are used may contain an average of from less than 1.0, say 0.2, to 3.0 xanthate groups per anhydroglucopyranosidic unit, and may be prepared by mixing liquid or gaseous carbon disulfide with an aqueous slurry of alkali dextran (obtained by reacting on the dextran with a strong alkali metal hydroxide and notably sodium hydroxide) and maintaining the mix at a temperature of from 20° C. to 25° C. until the desired degree of xanthation is attained, usually 2 to 4 hours using a molar ratio of alkali dextran to $CS_2$ of from 1:3 to 12:1.

The fibers or films formed from the mixture of viscose and dextran or dextran xanthate are after-treated in the same manner as fibers and films formed from the unmodified viscose, that is, they are desulfided, bleached, washed and finally dried. Softening agents such as glycerol may be incorporated in the films in the usual way, as a step in their manufacture, if desired.

The following examples are illustrative of specific embodiments of the invention.

Example I

One hundred and sixty (160) parts by weight of cotton linter pulp is steeped in 2000 parts of 18% sodium hydroxide at 25° C. for one hour. The alkali cellulose obtained is pressed to 400 parts, shredded for two hours at 35° C., and aged for 30 hours at 25° C. It is then placed in a barette and treated with 50 parts of carbon disulfide. The xanthation is conducted at 25° C. over a four-hour period, after which the cellulose xanthate is dissolved in 6% sodium hydroxide to give a 7% solution (viscose) which is filtered and ripened. Near the end of the ripening period, 10% (based on the cellulose weight) of native (unhydrolyzed) L.m. B-523 dextran in particulate condition is dissolved in the viscose, with stirring.

The homogeneous mass comprising the ripened viscose and alkali-soluble dextran is then extruded through a spinneret into a coagulating and regenerating bath comprising an aqueous solution of 9.5% sulfuric acid, 11.5% sodium sulfate and 1% of zinc sulfate. The filaments thus formed are drawn through the bath a distance of 6", withdrawn over a godet, and either in the form of running lengths or after collection as an annular package or cake in a centrifugal spinning bucket are subjected to the usual after treatments of the wet spinning process, and finally dried.

When the dried filaments are steeped in water, wrung out and dried at 50° C., the drying time is reduced almost one-half as compared to the drying time for similar fibers consisting of regenerated cellulose.

Example II

Example I is repeated except that 10% by weight, on the cellulose weight, of xanthated L.m. B-523 dextran containing an average of 2.0 xanthate groups per anhydroglucopyranosidic unit is mixed with the viscose after ripening thereof. The filaments obtained, which comprise a uniform mixture of regenerated cellulose and the water-insoluble dextran, exhibit decreased moisture pick-up retention capacity as compared to normal regenerated cellulose filaments.

Example III

Viscose is prepared and ripened as in Example I and about 15% of xanthated B-523 dextran having an average of about 2.0 xanthate groups per anhydroglucopyranosidic unit is dissolved therein, with stirring, after which the mixture is evacuated free of bubbles and used for forming film by the wet casting process. The film, on steeping in water, picked up and retained slightly less than half the amount of moisture picked up and retained by a plain regenerated cellulose film.

The fibers or continuous filaments may be formed into yarns alone or in mixture with other types of fibers or filaments and the yarns may be twisted and fabricated, as by weaving, knitting, etc. in the conventional way. Also, the continuous filaments, or yarns formed therefrom, may be cut or otherwise disrupted to obtain discontinuous or staple fibers which may be processed, alone or mixed with other fibers such as nylon, wool, cotton, cellulose acetate, "Orlon," "Dacron," etc., to spun yarns.

The films of the invention can be provided with moistureproofing coatings, if desired. Particularly suitable coatings are lacquers comprising benzyl dextran or nitrodextran, the latter being a new material in the lacquer art and which may be prepared by the method described in the pending application of L. J. Novak et al., filed February 11, 1954, Serial No. 409,781.

A suitable lacquer coating composition may be obtained by dissolving

|  | Percent |
|---|---|
| Nitrodextran or benzyl dextran | 57.0 |
| Dewaxed damar | 13.0 |
| Dibutyl phthalate | 23.0 |
| Paraffin wax | 4.0 |
| Zinc stearate | 1.0 | in an appropriate solvent or mixture of solvents, such as a mixture of 55.1% ethyl acetate, 3.5% denatured ethanol, and 41.4% toluene.

The water-insoluble dextran in the film has the effect of increasing the adherence of the lacquer coating to the base as is evidenced by the fact that prolonged (5 days) steeping of the coated film in water is required before the coating can be slipped over the surface of the base by rubbing the film between the fingers.

Films comprising adhesive dextran xanthate may be self-sealing on remoistening, that is they may be moistened, overlapped and adhered together under pressure, with or without the use of heat, which makes them attractive for packaging and wrapping purposes.

Lacquer coating compositions other than the one illustrated may be applied to the film, such as any of the nitrocellulose lacquer commonly used for moistureproofing cellophane.

Instead of incorporating the dextran or dextran xanthate in viscose, the regenerated cellulose fibers, yarns, films, etc. may be coated therewith, either from aqueous alkaline solution or from a solution in an organic solvent such as morpholine. The dextrans, and the xanthated dextran as well, are compatible with regenerated cellulose and coatings thereof adhere tenaciously to the base. It is to be noted that the xanthated dextrans exhibit more or less pronounced adhesive characteristics and may be particularly desirable as coatings for regenerated cellulose filaments and yarns to be used in tire cords, the adhesiveness of the coating serving to bind the individual filaments or yarns of the cord together, whereby wearing of the filaments or yarns as a result of abrasion due to rubbing thereof against each other is minimized, flowing of the regenerated cellulose which normally occurs under prolonged high stresses is counteracted, and the structure is stabilized with general improvement in the properties of the cord including their ability to accept deformation and flexure. The adhesiveness of the xanthated dextran coating on the filaments and cords also assists in anchoring the rubber to the cord, an extraneous adhesive or binder not being required in many instances.

*Example IV*

Rayon tire cords are formed into a tire fabric which is dipped into a treating composition comprising a 15% solution of native, unhydrolyzed B-523 dextran in sodium hydroxide solution. The fabric is removed from the treating solution, subjected to a stream of air to blow out excess treating medium and dried. The dried fabric comprises about 20% by weight of the dextran. It is wound up on a roll, from which it is supplied to a calender of usual type and in which the rubber deposit is sheeted out onto the fabric and forced onto and between the cords of the fabric. As it advances from the supply roll to the calender to sheet is sprayed lightly with water to render the dextran xanthate coating adhesive and insure bonding of the rubber to the sheet. After leaving the calender, the fabric having the rubber adhered thereto may be taken to other equipment such as the bias cutter, etc.

*Example V*

Conventional rayon tire cords are passed through a 50% solution of native xanthated (D.S. 1.5) *L.m.* B-523 dextran in sodium hydroxide solution at a speed to insure a contact time of three minutes between the cords and solution. The treated cords are then stretched between rollers while blowing air against them to remove excess treating medium, and dried. The dried cords carrying the dextran xanthate are formed into the usual weftless fabric, which is sprayed with water to render the xanthate adhesive and passed through a calender in which the rubber is sheeted out on the fabric and pressed on and into it.

Other tire cords or fabrics may be treated with the dextran xanthate and then bonded to rubber, including cords of nylon or tire reinforcement fabrics comprising them.

The dextran or dextran xanthate coating compositions for application to the regenerated cellulose films, fibers, yarns or fabrics may take the form of an aqueous alkaline solution or an organic solvent solution containing from 2% to 15% by weight of the xanthate. These compositions may be applied in any of the usual ways, as by spraying, brushing, or by contacting the article to be coated with a rotating roller partially submerged in the coating solution.

The mixture of viscose and dextran or dextran xanthate may be molded into massive shaped articles of all kinds and treated with the coagulating and regenerating medium.

It will be apparent that various changes and modifications may be made in the details described without departing from the spirit and scope of the invention. Therefore, it is to be understood that the invention is not to be limited except as defined in the appended claims.

What is claimed is:

1. A self-supporting film having reduced moisture pick up and retention capacity as compared to regenerated cellulose and consisting of a mixture of regenerated cellulose and from 2.0% to 50% on the cellulose weight of substantially water-insoluble, alkali-soluble dextran.

2. Fibers having reduced moisture pick up and retention capacity as compared to regenerated cellulose and consisting of a mixture of regenerated cellulose and from 2.0% to 50% on the cellulose weight of substantially water-insoluble, alkali-soluble dextran.

3. Yarns formed from fibers having reduced moisture pick up and retention capacity as compared to regenerated cellulose and consisting of a mixture of regenerated cellulose and from 2.0% to 50% on the cellulose weight of substantially water-insoluble, alkali-soluble dextran.

4. Regenerated cellulose having reduced moisture pick up and retention capacity as compared to regenerated cellulose and articles carrying an adherent coating of substantially water-insoluble, alkali-soluble dextran.

5. A regenerated cellulose film having reduced moisture pick up and retention capacity as compared to regenerated cellulose and carrying an adherent coating of substantially water-insoluble, alkali-soluble dextran.

6. Regenerated cellulose fibers and yarns having reduced moisture pick up and retention capacity as compared to regenerated cellulose and carrying an adherent coating of substantially water-insoluble, alkali-soluble dextran.

7. Tire cords having reduced moisture pick up and retention capacity as compared to regenerated cellulose and carrying a coating of water-insoluble, alkali-soluble dextran.

8. A shaped article of fiber, yarn or film having a reduced moisture pick-up and retention capacity as compared to regenerated cellulose shapes, said shaped article being formed of regenerated cellulose modified with a substantially water-insoluble, alkali soluble dextran, the amount of said dextran present being from 2.0% to 50% by weight of the said cellulose.

9. A filament having a reduced moisture pick-up and retention capacity as compared to regenerated cellulose filaments, said filament being formed of cellulose xanthate dissolved in aqueous alkali metal hydroxide modified by the addition of water-insoluble, alkali soluble dextran, the amount of said dextran present being from 2.0% to 50% by weight of the said cellulose.

10. A filament as set forth in claim 9, wherein the alkali soluble dextran comprises about 10% by weight of the cellulose xanthate.

References Cited in the file of this patent

UNITED STATES PATENTS

| | | |
|---|---|---|
| 2,071,558 | Morgan | Feb. 22, 1937 |
| 2,099,441 | Heckert | Nov. 16, 1937 |
| 2,155,067 | Ubbelohde | Apr. 18, 1939 |
| 2,211,931 | Izard | Aug. 20, 1940 |
| 2,224,693 | Picard | Dec. 10, 1940 |
| 2,674,517 | Deniston | Apr. 6, 1954 |
| 2,705,184 | Drisch | Mar. 29, 1955 |
| 2,732,279 | Tachikawa | Jan. 24, 1956 |